United States Patent [19]
Mahnig et al.

[11] Patent Number: 5,100,217
[45] Date of Patent: Mar. 31, 1992

[54] WHEEL BEARING

[75] Inventors: Fritz Mahnig, Schaffhausen, Switzerland; Edgar Becker, Mettmann, Fed. Rep. of Germany

[73] Assignee: Georg Fischer AG, Schaffhausen, Switzerland

[21] Appl. No.: 658,101

[22] Filed: Feb. 20, 1991

[30] Foreign Application Priority Data

Feb. 21, 1990 [CH] Switzerland ............... 556/90

[51] Int. Cl.⁵ .................................. F16C 27/06
[52] U.S. Cl. .................... 384/542; 384/536; 384/907.1; 384/913
[58] Field of Search ........... 384/542, 544, 585, 535, 384/536, 907.1, 913

[56] References Cited

U.S. PATENT DOCUMENTS

| | | | |
|---|---|---|---|
| 1,479,445 | 1/1924 | Baninger | 384/544 |
| 2,105,354 | 1/1938 | Hoerte | 384/544 |
| 3,746,413 | 7/1973 | Nishikawa | 384/542 |
| 4,222,441 | 9/1980 | Van der Lely et al. | 384/542 |

Primary Examiner—Lenard A. Footland
Attorney, Agent, or Firm—Bachman & LaPointe

[57] ABSTRACT

The proposed wheel bearing has a hub 1 mounted on the preferably integral bearing shaft 4 of a wheel part 5. The hub 1 rotates on a ball bearing arrangement 2. The ball bearing inner ring or rings 3 are stressed via a washer 10 against a shoulder 6 on the bearing shaft 4. In order that the bearing shaft 4 can take greater operational forces the bearing shaft 4 has an axial bore 7, which accommodates a draw bolt 8 screwed into a plastics sleeve 13 so as to prestress the inner ring or rings 3. In this way the securing of the assembly avoids tensile stress in the shaft 4.

11 Claims, 1 Drawing Sheet

WHEEL BEARING

The present invention relates to a wheel bearing in which a wheel part such as a stub axle or steering arm (knuckle) is mounted in a hub by way of a bearing shaft, in particular a shaft formed in one piece with the arm as a cast piece, with a roller bearing arrangement between the hub and the shaft.

With wheel bearings a method is known for mounting a bearing shaft by way of a ball bearing in a hub. In this construction the bearing bolt is formed usually in one piece with the arm, perhaps as a steel part. The bearing shaft is stressed here mainly in tension. The operational forces acting on it, are, on the one hand, vertical wheel loads and, on the other hand, side and braking forces. Because of the stress on the bearing bolt from tensile force the tolerance of operational forces is correspondingly restricted.

The object of the present invention is to provide a wheel bearing which in a simple manner allows the bearing shaft to take greater operational forces.

According to the invention there is provided a wheel bearing comprising a hub part, a wheel part including a shaft, a rolling bearing mounted on the shaft and a retaining means for retaining the hub on the shaft, the wheel part being arranged to rotate on the shaft by means of the rolling bearing, wherein the shaft has an axial bore and the retaining means comprises a bolt passing through this bore and a securing means holding the end of the bolt.

In this way the bearing shaft is no longer stressed by tensile force since this force is taken up by a draw bolt, so that the tensile and compressive stresses are separated. The bolt is preferably threaded, with the securing means being a plastics sleeve-acting as a nut fitting into a corresponding recess at the end of the bore, thus providing at the same time protection against corrosion.

Further optional features and advantages will be apparent from the following description and the subclaims.

An embodiment of the invention will now be described in more detail with reference to the accompanying drawings, in which.

Figure 2:
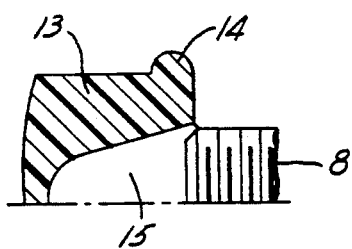
FIG. 2 shows a securing sleeve for the wheel bearing in FIG. 1 in the uninstalled state.

The wheel bearing shown comprises a hub 1, which by means of an axially central annular ridge 18 forms at the same time the outer ring race of a double ball bearing 2 forming the rolling bearing. The inner rings 3 of the ball bearings 2 are arranged axially adjacent to each other. The inner rings 3 engage with a bearing shaft 4 passing through them. The shaft is constructed, for its part, in one piece with a wheel part 5 such as a steering arm or knuckle. Here the bearing shaft 4 and the knuckle 5 are one cast piece. The bearing shaft 4 has a shoulder 6 for supporting one of the inner rings 3 in one axial direction and an axial bore 7 for a draw bolt 8, which with its head presses a pressure washer 10 against the other inner ring 3; the inner rings 3 are thus stressed against the shoulder 6.

The bore 7 continues towards the end side of the knuckle 5 issuing in an axial recess 11. The recess 11 has in addition at least one circumferential groove 12, produced by undercutting, adjacent to the base of the recess 11, i.e. at the end nearer the bolt. The recess 11 serves to accept a securing sleeve 13 of plastics material, for example nylon, which has a circumferential bead 14 projecting outwardly and corresponding to the circumferential groove 12. The sleeve 13 has, furthermore, a substantially conical axial recess 15, the base diameter of which is larger than that of the threaded section 16 of the draw bolt 8.

Figure 1:
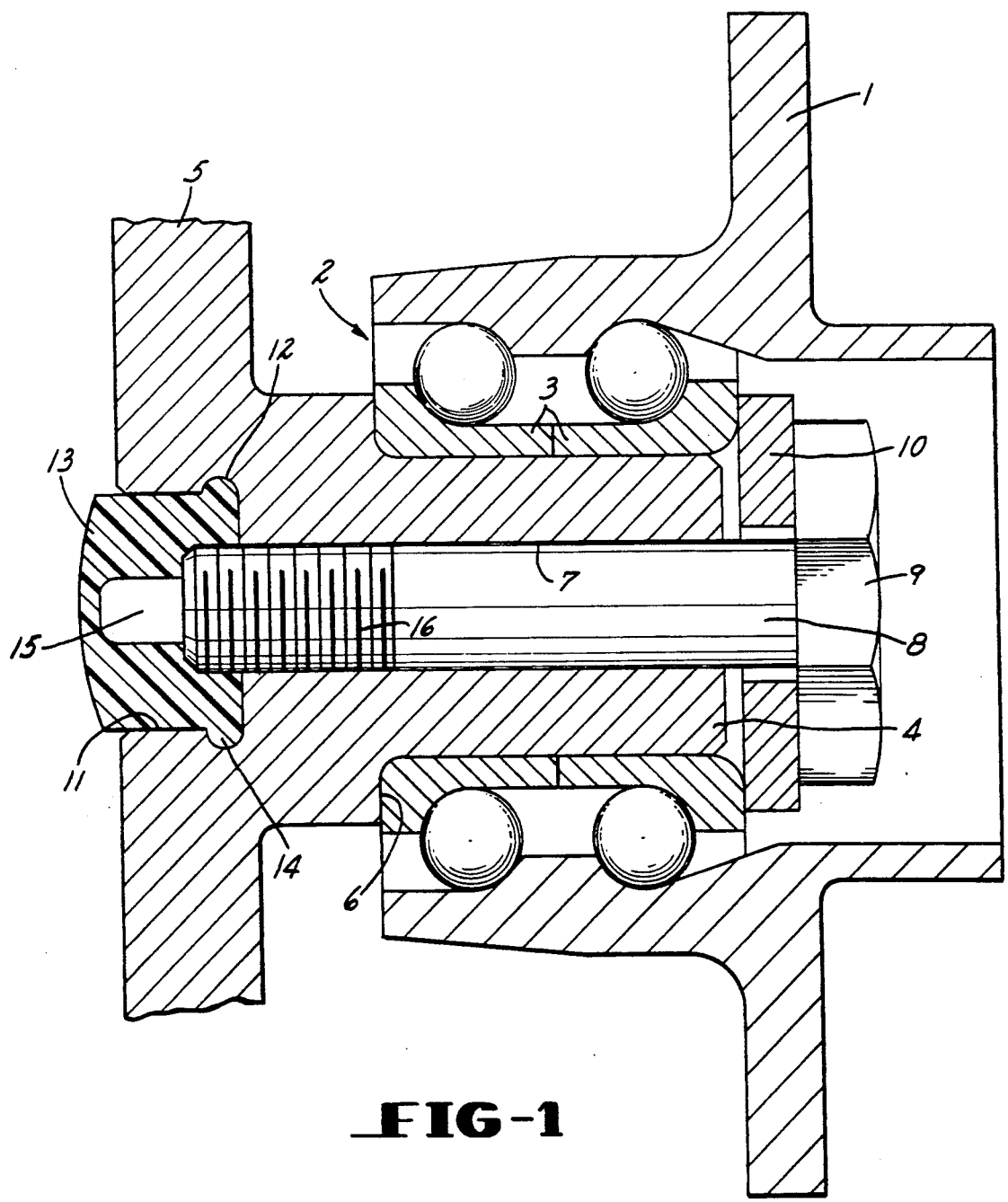
FIG. 1 shows a wheel bearing in section.

To assemble the bearing the securing sleeve 13 is inserted into the recess 11. The draw bolt 8 is then inserted into the bore 7, whereupon the free end region of its threaded section 16 arrives in the recess 15 and is screwed into the position represented in FIG. 1, engaged with the securing sleeve 13. The draw bolt 8 is thus effectively secured by the securing sleeve 13 against unintentional loosening and takes the tensile force whilst, because of the lack of tension load, the bearing bolt 4 can sustain increased operational forces.

The knuckle 5, and in the integral construction the shaft also, is manufactured preferably from spheroidal graphite iron or light metal.

We claim:

1. A wheel bearing comprising a hub part, a wheel part including a shaft, a rolling bearing mounted on the shaft and a retaining means for retaining the hub on the shaft, the wheel part being arranged to rotate on the shaft by means of the rolling bearing, wherein the shaft has an axial bore and the retaining means comprises a bolt passing through this bore and a securing means holding the end of the bolt.

2. A wheel bearing according to claim 1, in which the bolt is threaded and the securing means is a sleeve into which the end of the bolt is screwed.

3. A wheel bearing according to claim 2, in which the screw securing means fits into a recess representing a widening of the axial bore.

4. A wheel bearing according to claim 2, in which the screw securing means consists of a deformable sleeve of plastics provided with a substantially conical axial recess accommodating the end of the draw bolt.

5. A wheel bearing according to claim 4, in which the sleeve has at least one outwardly projecting circumferential bead and the recess has a corresponding groove so that the groove anchors the sleeve in the recess.

6. A wheel bearing according to claim 1, in which the axial bore extends all the way through the shaft.

7. A wheel bearing according to claim 1, in which the wheel part is manufactured of a spheroidal graphite iron or light metal.

8. A wheel bearing according to claim 1, in which the shaft is integral with the wheel part.

9. A wheel bearing according to claim 1, in which the rolling bearing comprises two axially adjacent ball bearings.

10. A wheel bearing according to claim 9, in which the radially outer race of each ball bearing is formed by the hub part and the inner race is formed in each case by an annular channel.

11. A wheel bearing according to claim 10, in which the bearing shaft has a shoulder against which the inner races of the ball bearings are stressed by the bolt via a washer.

* * * * *